(12) United States Patent
Harkin

(10) Patent No.: US 6,671,995 B1
(45) Date of Patent: Jan. 6, 2004

(54) FISHING LURE

(76) Inventor: Pat Harkin, 2329 W. Huron St., Chicago, IL (US) 60612

( * ) Notice: Subject to any disclaimer, the term of this patent is extended or adjusted under 35 U.S.C. 154(b) by 0 days.

(21) Appl. No.: 10/137,276

(22) Filed: May 2, 2002

(51) Int. Cl.[7] .............................................. A01K 85/01
(52) U.S. Cl. ........................................ 43/17.6; 43/17.5
(58) Field of Search ................................. 43/17.6, 17.5

(56) References Cited

U.S. PATENT DOCUMENTS

| | | | | |
|---|---|---|---|---|
| 4,669,213 A | * | 6/1987 | LeRoy | 43/17.6 |
| 4,819,361 A | * | 4/1989 | Boharski | 43/17.6 |
| 4,885,864 A | * | 12/1989 | Carner | 43/17.5 |
| 5,159,773 A | * | 11/1992 | Gentry et al. | 43/17.1 |
| 5,175,951 A | * | 1/1993 | Fruchey | 43/17.6 |
| 5,461,815 A | * | 10/1995 | Rodgers | 43/17.6 |
| 5,987,802 A | * | 11/1999 | Caprio | 43/17.5 |
| 6,079,144 A | * | 6/2000 | Morgan et al. | 43/17.6 |

* cited by examiner

*Primary Examiner*—Charles T. Jordan
*Assistant Examiner*—Bret Hayes

(57) ABSTRACT

An improved fishing lure has a hollow body containing an illumination source and an electrical power source. An arm passes through a small hole in the fishing lure body. A flexible seal holds the arm in place, prevents water from entering the lure, and acts as a pivot. The interior portion of the arm contains an electrical contact. Water movement deflects the exterior portion of the arm, which pivots around the seal, closes the connection to the power source, and causes the illumination source to produce light.

19 Claims, 1 Drawing Sheet

FISHING LURE

BACKGROUND OF THE INVENTION

1. Field of the Invention

The present invention relates to a fishing lure for use in connection with attracting and catching fish, especially in muddy or turbid waters or when fishing at night. The fishing lure has particular utility in connection with a novel power switching mechanism which conserves electrical power and extends the operating life of the electrical power source.

2. Description of the Prior Art

Fishing lures, also known as artificial baits, are desirable for attracting and catching fish. They are widely appreciated for their ability to mimic baitfish, such as minnows, but they are also known to trigger feeding activity among the target fish population by presentation of phenomena not found in natural fish populations. The subject of the present application is a fishing lure that produces light from an internal illumination source. The spectral wavelength of the internal illumination source may be controlled in a variety of ways, and may be made to simulate the normal flash of light produced by baitfish while swimming. Alternately, the spectral wavelength may be made to emit light at a spectral wavelength or wavelengths not normally present in nature, thereby providing an uncommon stimulus to a feeding fish. In a manner analogous to the spectral wavelength of the light, the light stimulus may be presented in ways not normally present in nature. While providing these desirable attributes, the construction of the fishing lure in the present application also improves on existing art by providing an improved switching mechanism which conserves electrical power, thereby extending the operating life of the fishing lure.

The combination of fishing lure and illumination is known in the prior art. For example, U.S. Pat. No. 5,987,802 to Caprio discloses a method of illuminating a fishing lure of conventional construction. However, the lure of the Caprio '802 patent does not include an internal illumination source, but instead provides an external illuminator connected to a fishing line at a leading end and a fishing lure or bait at a trailing end. The art taught by the Caprio '802 patent relies on light transmission from the external illuminator through the water and onto the trailing fishing lure or bait. This has the disadvantages of adding weight and length to the total mass of fishing tackle, increasing the possibility of snagging in weeds, submerged brush, or other submerged obstacles. As taught in Caprio, light from the external illuminator may subtend a narrow solid angle so that battery energy is only used to illuminate the lure; however, movement of the lure away from the axis of illumination during motion through the water defeats the purpose of the illuminator. Furthermore, the relatively long light transmission path from the external illuminator to the trailing bait has the further drawback of introducing an attenuation light path in murky or turbid waters, thereby reducing the light impinging on the bait. Finally, the arrangement taught by Caprio relies on line tension to activate operation of the external illuminator. This arrangement may place restrictions on the weight of the trailing bait (a heavier bait will introduce additional line tension), and a bait that is snagged or "hung" will continue to deliver light output until the line tension is relieved.

U.S. Pat. No. 4,426,803 to Helling discloses an illuminated fishing lure that contains a light within a hollow plastic body. The problem of power consumption when the lure is snagged is addressed by a mechanical arrangement which interrupts the electrical circuit to the light when a fish hook on a tail section is snagged. The Helling '803 patent teaches a fishing lure construction in which a forward hollow head section and a rear hollow main body and tail section are connected in sliding male-female or telescoping relation. A switch mechanism in the interior of the telescoping section is arranged so that a slight relative motion of the two body sections is sufficient to break open the switch contact elements. It is especially important to note that the Helling '803 patent does not include a mechanism to allow power control according to conditions of use. If the two body sections are compressed toward one another, the electrical power source is permanently connected. If the two body sections are moved sufficiently far apart to break open the switch contact elements, the electrical power source is permanently disconnected until the two body sections can be recompressed toward one another by the fisherman. Tension on the fish line connected to the head section moves the two sections apart to break the circuit. A mechanical stop limits the relative movement between the body sections, and an "O" ring is used to maintain the watertight integrity of the body. However, the Helling '803 patent does not entirely satisfy the conditions necessary for reliable operation. Those familiar with the mechanical arts will recognize that telescoping or sliding mechanisms are subject to wear, galling, corrosion, lack of lubrication, and other factors which can interfere with the repeatability and dependability of a sliding fit. Additionally, the condition of the "O" ring in the sliding assembly contributes varying amounts of friction to the sliding operation. Thus, those familiar with these issues would consider it likely that the wear characteristics of the sliding fit and "O" ring arrangement would be associated with variable amounts of tension being required to actuate the switch assembly during the operating life of the apparatus. It may be expected that increased friction from the above causes would require added line tension before the switch mechanism activates, thereby allowing the light be energized for longer periods of time than are intended. In extreme cases, increased friction from the above causes may prevent the switch from opening. Additionally, manufacturing tolerances can produce the opposite type of error in which the sliding fit and "O" ring are relatively loose. In such circumstances, a relatively heavy fishing lure with the Helling '803 mechanism may inadvertently actuate the switch as the lure is cast, prematurely disconnecting the light from the battery.

Similarly, U.S. Pat. No. 6,079,144 to Morgan et al. discloses a fishing lure that also incorporates a switch operated by an interior sliding mechanical element in the form of a tapered rod. However, the Morgan '144 patent differs from the Caprio '802 and Helling '803 patents in that the operation of the switching element is due to gravity or to mechanical actuation by the fisherman. The purpose of the Morgan '144 patent is not battery conservation, but rather to produce intermittent operation of the light in order to provide one of a plurality of stimuli to fish in the vicinity of the lure. The purpose of the Morgan '144 patent is different in scope and desired effect than are the teachings of Caprio, Helling, and the present invention. In particular, the switching element is intended to produce intermittent light actuation, and may easily remain in an actuated condition if the bait is snagged. Power consumption of the electrical power source is not taught in Morgan.

A further example of prior art is found in U.S. Pat. No. 4,227,331 to Ursrey et al., which discloses a fishing lure that contains a battery and externally mounted light emitting diodes. However, the Ursrey '331 patent does not incorporate a switching element for illumination control and battery conservation in the same sense as taught by the preceding citations. Rather, Ursrey teaches away from illumination control and battery conservation inasmuch as Ursrey '331 is clearly intended to produce illumination whenever the lure is in water, even though illumination produced by the lure may be made intentionally intermittent through operation of an astable multivibrator or similar apparatus in the electrical circuitry of the fishing lure. Those familiar with the electrical arts will recognize that an astable multivibrator will dissipate power whenever the power source is connected, even though the illumination source driven by the multivibrator may not be producing illumination. Thus, the Ursrey '331 patent has the deficiency of undesirably high power consumption. Additionally, the Ursrey '331 patent is very specific in requiring that the light emitting diodes be rigidly mounted to and protruding outwardly from the body of the lure, with a peak emission wavelength between about 550 to 575 nm.

Lastly, U.S. Pat. No. 3,040,462 to Guida discloses an illuminated fishing lure that does not contain a switching element of any sort. Electrical contact is established when the lure body portions are engaged together, thereby forcing the battery terminals against the base of a light bulb and other internal structures that remain in permanent electrical connection while the lure body portions remain engaged. Although Guida indicates the light source may be made intermittent by an on-off element or blinker, the switching mechanism of the Guida '462 patent clearly does not provide a power conservation function. Once the lure body portions are engaged, electrical power is dissipated from the battery whether the lure is in air or in water, snagged or freely moveable through the water, with attendant loss of battery operating life.

While the above-described devices fulfill their respective particular objectives and requirements, the aforementioned patents do not describe a fishing lure that allows a true power conservation function adapted to the operating conditions particular to fishing. The Caprio '802 patent teaches the use of an illumination source external to and independent of the fishing lure itself, with power application to the illumination means being controlled by tension on the fishing line. The Helling '803 patent recognizes the need for power conservation, but the art taught in Helling is capable of improvement, as the electrical connection powering the illumination source is either continuously enabled when the body sections are suitably engaged, or continuously disabled once the body sections have been suitably separated. Thus, accidental disengagement defeats the purpose of the Helling '803 invention until the fisherman intervenes to reconnect the two body halves, thereby reestablishing electrical connection between the illumination source and electrical power source. The Morgan '144 patent is clearly intended to produce light at any time the switching mechanism is suitably oriented to the earth's gravity vector or whenever the fisherman's actions may dictate; no power conservation mechanism is taught. The Ursrey '331 patent clearly teaches that the light source is to be active, although possibly intermittently so, at any time the lure is in the water, and thus no power conservation mechanism is taught. Lastly, the Guida '462 patent makes no provision for power conservation; once the lure's body segments are engaged, the electrical power source and illumination source are permanently connected.

Therefore, a need exists for a new and improved fishing lure that can be used to produce illumination while in the water, yet which also provides a mechanism for reliable power conservation if the lure is out of the water or snagged on brush or some other underwater obstacle. In this regard, the present invention substantially fulfills this need. In this respect, the fishing lure according to the present invention substantially departs from the conventional concepts and designs of the prior art, and in doing so provides an apparatus primarily developed for the purpose of producing illumination while in the water, yet which also provide reliable power conservation if the lure is out of the water or snagged on an underwater obstacle.

SUMMARY OF THE INVENTION

In view of the foregoing disadvantages inherent in the known types of fishing lures now present in the prior art, the present invention provides an improved fishing lure, and overcomes the above-mentioned disadvantages and drawbacks of the prior art. As such, the general purpose of the present invention, which will be described subsequently in greater detail, is to provide a new and improved fishing lure and method for use of such a fishing lure which has all the advantages of the prior art mentioned heretofore and many novel features that result in a fishing lure which is not anticipated, rendered obvious, suggested, or even implied by the prior art, either alone or in any combination thereof.

To attain this, the present invention essentially comprises a hollow body with a small aperture, an illumination source located inside the hollow body, an electrical power source located inside the hollow body, and an actuation arm which passes through the small aperture in the hollow body. The actuation arm is joined to the hollow body by a flexible seal which holds the actuation arm in place, which acts as a pivot point, and which also prevents water from entering the hollow body of the fishing lure. The interior portion of the actuation arm contains, in the simplest case, a conductive contact which is attached to the actuation arm. The exterior portion of the actuation arm may be shaped like a spoon, a fin, a paddle, or a similar structure which can both influence the motion of the fishing lure as it moves through the water and which also resists the motion of the lure through the water. Because the exterior portion of the actuation arm resists the flow of water, the movement of water past the exterior portion of the actuation arm produces a force which deflects the exterior portion of the actuation arm. This force causes the exterior portion of the actuation arm to move slightly and, because the actuation arm pivots around the flexible seal, the interior portion of the actuation arm then moves and closes an electrical connection to the electrical power source. The electrical connection established by this motion of the actuation arm allows electricity to flow through the illumination source, and the illumination source produces light.

In contrast to other devices in the prior art, the operation (or actuation) of the electrical connection within the hollow body of the fishing lure is controlled by relative motion of water past the exterior portion of the actuation arm. Thus, if the lure is cast and reeled toward the fisherman in still water, there is relative motion of water past the actuation arm and the electrical connection allows electricity to flow through the illumination source, thereby producing light. If the lure is cast and held stationary in a stream of moving water, there still is relative motion of water past the actuation arm and the electrical connection allows electricity to flow through the illumination source, thereby producing light. If the lure is cast and allowed to lie still in quiet water, or if the lure is cast and allowed to float freely in moving water, there is no relative motion of water past the exterior portion of the actuation arm; as a result, there is no electrical connection and there is no illumination. Thus, it may be seen that it is relative motion of water against the spoon-, fin-, or paddle-shaped exterior portion of the actuation arm that ultimately causes the light source to illuminate.

It then may be understood how this invention differs from other devices described in the prior art. Prior art devices may provide no external control of the flow of electricity through the illumination source (as in the Ursrey '331 and Guida '462 patents), or they may require operation governed in some way by line tension (as in the Caprio '802 and Helling '803 patents) or the correct orientation of gravity and mechanical forces applied by the fisherman (as in the Morgan '144 patent). In the present invention, control of electricity flow and illumination is accomplished by the relative motion of water across the exterior portion of the actuation arm.

In the simplest case, the actuation arm is essentially a simple lever that pivots about the aperture in the hollow body of the fishing lure. However, it is entirely possible to devise small mechanisms that can improve on the simple lever action of the actuation arm. For example, a small over-center cam could be used to overcome a spring and snap the electrical contact into position once the force of relative water motion against the actuation arm reaches a predetermined level. When the force of relative water motion against the actuation arm falls below this predetermined level, spring force causes the electrical contact to snap open, which opens the electrical circuit to the illumination source. The relative forces involved are determined by a number of considerations—for example, area of the spoon, fin, or paddle; desired velocity of water past the spoon, fin, or paddle; the need for relatively large actuation forces as in a trolling lure; the need for relatively small actuation forces as for a surface bait—and thus the basic concept behind this invention can be expanded by mechanism design and other matters of design choice.

Similarly, the selection of illumination source presents a number of opportunities to optimize the design of the lure for different fish and different conditions. The color (optical wavelength) of the light source can be selected to be primarily one color (for example, red or green), a wide range of colors (for example, a white LED or incandescent bulb), or a combination of these choices. The presentation of the illumination can be steady (continuous), intermittent with a fixed duty cycle, or randomly intermittent as the designer or fisherman may choose.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing lure that has all of the advantages of the prior art and none of the disadvantages.

It is another object of the present invention to provide a new and improved fishing lure that may be easily and efficiently manufactured and marketed.

An even further object of the present invention is to provide a new and improved fishing lure that has a low cost of manufacture with regard to both materials and labor, and which accordingly is then susceptible of low prices of sale to the consuming public, thereby making such fishing lure economically available to the buying public.

Still another object of the present invention is to provide a new fishing lure that provides in the apparatuses and methods of the prior art some of the advantages thereof, while simultaneously overcoming some of the disadvantages normally associated therewith.

Lastly, it is an object of the present invention is to provide a fishing lure which offers improved control of electrical power from the power source, which allows greatly improved power conservation and thereby provides greater operating life from the power source.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
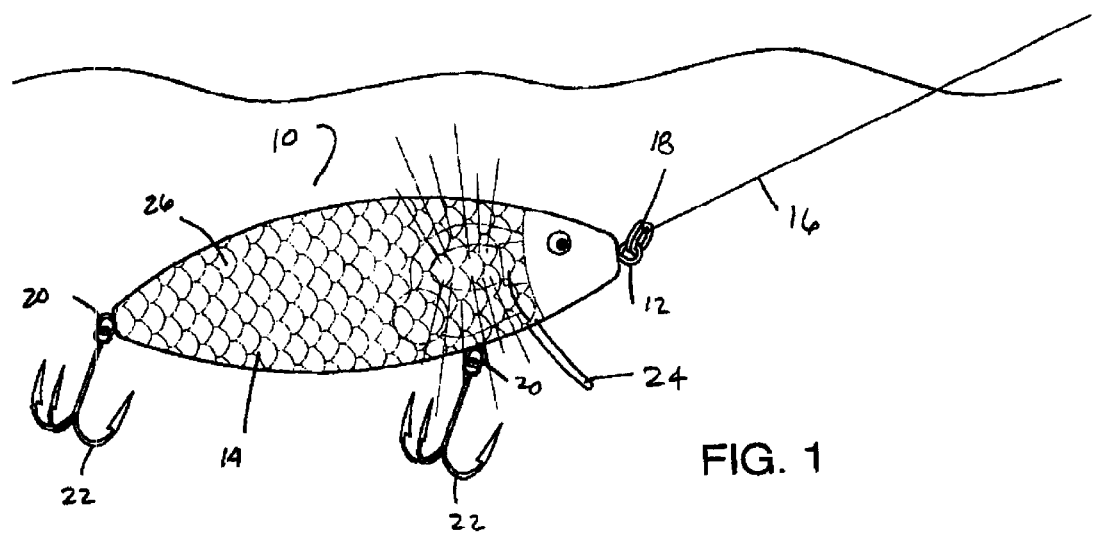
FIG. 1 is an orthogonal side view of the preferred embodiment of the fishing lure constructed in accordance with the principles of the present invention in use.
Figure 2:
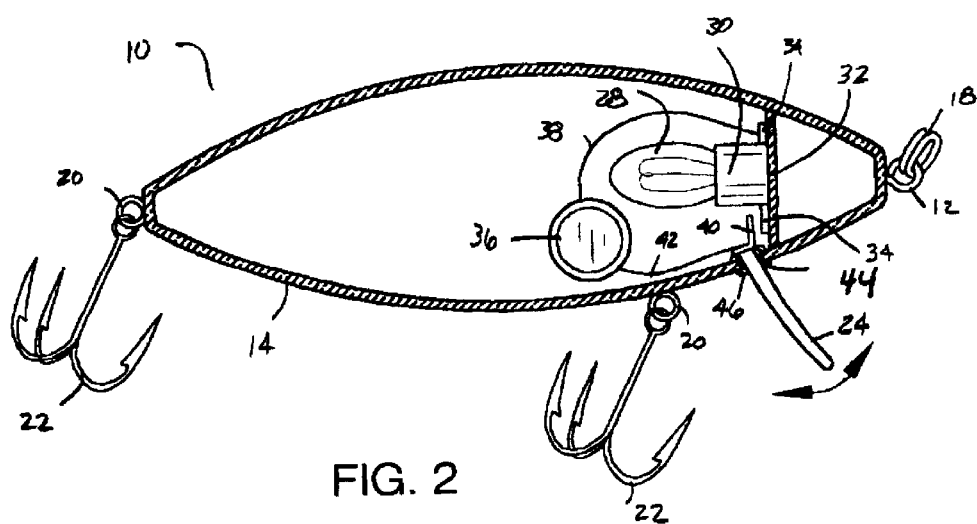
FIG. 2 is an orthogonal side cross sectional view of the fishing lure of the present invention illustrating a dual contact wired to a battery. Illustration arrows indicate that fins on the bottom of the invention pivot back and forth.

Referring now to the drawings, and particularly to FIGS. 1–2, a preferred embodiment of the fishing lure of the present invention is shown and generally designated by the reference numeral 10.

In FIG. 1 is shown a new and improved fishing lure 10 of the present invention for attracting and catching fish, especially in muddy or turbid waters or when fishing at night. The new and improved fishing lure 10 of the present invention also contains a novel power switching mechanism which conserves electrical power and extends the operating life of the electrical power source. More particularly, the fishing lure 10 has a line eyelet 12 mounted at the forward end of the hollow body 14 of the lure 10. The function of line eyelet 12 is to allow attachment of the lure 10 to a fishing line 16, which is to be interpreted to include monofilament nylon or similar synthetic lines, cotton line, or metallic leaders. Connection to line eyelet 12 may be established by tying fishing line 16 directly to line eyelet 12 or, as is common practice, by a small coupling element 18 permanently attached to fishing line 16.

The aft end of fishing lure 10 typically has one or a plurality of hook eyelets 20 attached to the aft end of hollow body 14. Each of the hook eyelets 20 connects to one or more hooks 22, shown in FIG. 1 as treble hooks for the sake of illustration. The number and location of the hook eyelets 20, and the number and type of hooks 22, are not limited to the types illustrated.

Fishing lure 10 also supports an actuation arm 24, the external portion of which is shown as depending from the hollow body 14 of fishing lure 10. In FIG. 1, the exterior portion of actuation arm 24 is shown as being in the shape of a fin; however, the shape of the exterior portion of actuation arm 24 is a matter of design choice, and the external portion of actuation arm 24 may also be formed in the shape of a spoon or paddle, for example. The hollow body 14 of fishing lure 10 will ordinarily be transparent or translucent to allow the escape of internally generated light, as will be discussed later in greater detail. The wall of the hollow body 14 of the fishing lure 10 may be painted or molded with a pattern or texture 26, which is shown as a scaled texture in FIG. 1.

Referring now to FIG. 2, the interior of fishing lure 10 is seen to consist of an illumination source 28, shown as a small incandescent bulb for purposes of illustration, mounted in a socket 30 of a type suitable for the illumination source 28 mounted therein. Socket 30 and illumination source 28 contained therein are mounted to a transverse wall 32 rigidly mounted inside the hollow body 14 of fishing lure 10. Transverse wall 32 bears at least one illumination source contact 34 that establishes electrical contact with the electrical elements of illumination source 28 via the corresponding electrical elements of socket 30. It will be most common to have two illumination source contacts 34 when illumination source 28 is an incandescent bulb, as is shown in FIG. 2, or one or more light emitting diodes (LEDs), but those familiar with the electrical arts will realize that commercially available illumination sources 28 and sockets 30 are available with a variety of terminations including lead wires. All such variations are design options to enhance manufacturability, but the use of such design options are anticipated by, and held to be consistent with, the fishing lure 10 of the present invention. Similarly, transverse wall 32 may be a circuit board on which are installed some combination of illumination source 28, socket 30, and illumination source contacts 34. Once again, these are matters of design choice to enhance manufacturability, but the use of such variations are anticipated by, and held to be consistent with, the fishing lure 10 of the present invention.

Referring again to FIG. 2, the hollow body 14 of fishing lure 10 also contains an electrical power source 36 that provides operating power for illumination source 28. The electrical power source 36 is typically one battery or a plurality of batteries connected in series. For purposes of illustration, FIG. 2 shows electrical power source 36 as a single battery. A first end of electrical power source 36 is connected to a first electrical illumination source contact 34 by means of a wire 38. A second end of electrical power source 36 is connected to an electrically conductive contact element 40 by a wire 42.

It is seen that electrically conductive contact element 40 is affixed to the interior portion of actuation arm 24. Actuation arm 24 is installed in a small hole 44 in the wall of hollow body 14. Actuation arm 24 is held in place by a flexible seal 46, which not only confines actuation arm 24 to the proper position within hollow body 14, but also prevents water entry into the interior of hollow body 14. One additional purpose of the flexible seal 46 is to serve as a pivot for actuation arm 24. It may be seen that, in a rest state, actuation arm 24 is oriented such that a gap exists between electrically conductive contact element 40 and second illumination source contact 34. Thus, when actuation arm 24 is not subject to any external force, electrically conductive contact element 40 is not connected to illumination source contact 34, and illumination source 28 is in an off condition, for there is no complete electrical connection between illumination source 28 and electrical power source 36. This behavior is important, because it means that illumination source 28 will be off unless an external force operates on actuation arm 24. No power will be consumed from electrical power source 36 unless actuation arm 24 is moved to establish contact between electrically conductive contact element 40 and the second illumination source contact 34. This is the essence of the power conservation function of fishing lure 10, the present invention.

Operation of fishing lure 10 may now be understood by reference to FIGS. 1–2. As has been described, illumination source 28 is off if actuation arm 24 experiences no external force, because there is no complete electrical connection between illumination source 28 and electrical power source 36. Actuation arm 24 is constructed to be responsive to movement of water past the exterior portion of actuation arm 24. Thus, when fishing lure 10 is cast by the fisherman, if it is allowed to lie quietly in still water or if it is allowed to drift in moving water, there will be no relative motion of water past the exterior portion of actuation arm 24, and illumination source 28 will be off. If, on the other hand, the fisherman begins to retrieve fishing lure 10 by moving it through the water, there is relative motion of water past the external portion of actuation arm 24. Because the external portion of actuation arm 24 is shaped like a spoon, fin, paddle, or similar structure, relative motion of water past the external portion of actuation arm 24 produces a force which deflects actuation arm 24 in the direction shown by the arrow in FIG. 2. When this happens, actuation arm 24 pivots around flexible seal 46, which causes electrically conductive contact element 40 to move and come into electrical contact with the second illumination source contact 34, thereby completing the electrical connection between illumination source 28 and electrical power source 36. This produces illumination, but only when there is relative motion of water past the exterior portion of actuation arm 24. Similarly, if fishing lure 10 is cast by the fisherman and is pulled behind a moving boat, as during trolling, there is relative motion of water past the exterior portion of actuation arm 24, which completes electrical connection between illumination source 28 and electrical power source 36, resulting in illumination. In like manner, if fishing lure 10 is cast into moving water by the fisherman and fishing line 16 is held steady, there still is relative motion of water past the exterior portion of actuation arm 24, which completes electrical connection between illumination source 28 and electrical power source 36, resulting in illumination. If, however, fishing lure 10 is snagged by brush or some other obstruction, there will most likely be no relative motion of water past the exterior portion of actuation arm 24. In this event, actuation arm 24 returns to the normal position, which disconnects electrically conductive contact element 40 from the second illumination source contact 34 and illumination source 28 turns off, thereby conserving power in electrical power source 36.

While a preferred embodiment of the fishing lure has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable illumination source such as conventional single-color (emitting over a relatively narrow spectral waveband) light emitting diodes, white light emitting diodes (emitting over a relatively wide spectral waveband), infrared light emitting diodes, or multiple light emitting diodes of similar or different characteristics may be used instead of the incandescent bult described. Although the operation of the invention has been described as if the illumination source is either off or continuously on, the illumination source is capable of being operated in an intermittent manner which is either deterministic (for example, with a fixed duty cycle) or random once operation of the illumination source has been enabled. Depending on manufacturing requirements, it may not be necessary to use a separate socket for the illumination source because certain illumination sources, such as light emitting diodes and certain incandescent bulbs, may be mounted directly to a circuit board without use of a socket. Likewise, manufacturing considerations may form the illumination source contacts from circuit board traces, rivets, screw heads, or similar structures. The flexible seal may be a gasket, a grommet, an "O" ring, or may be formed by flexible material poured and cured in place. Although the exterior portion of the actuating arm has been described variously as being shaped as a spoon, fin, or paddle, it should be appreciated that the exterior portion of the actuating arm herein described may be of any number of other shapes, each of which is not only suitable for producing actuating force by the operation of relative water motion, but each of which is also suitable for imparting different types of motions, or "actions," to the lure as it experiences relative motion through the water. Any number of hooks and types of hooks may be employed, and they may be mounted at any number of locations on the body of the lure.

It will also be appreciated that any practical apparatus to implement the fishing lure already described will have some means to disassemble and assemble the fishing lure for purposes or replacing the electrical power source and the illumination source. These are manufacturing considerations which, although they ordinarily must be present in some form, are not necessary for the comprehension of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A fishing lure comprising:
a hollow body having an aperture therein;
an illumination source mounted within said body;
an electrical power source mounted within said body;
a pivotally mounted actuation arm penetrating said aperture in said body, said
actuation arm having a portion internal to said body and a portion external to said body;
an electrically conductive contact element mounted inside said body having a nonconductive position and a conductive position, said conductive contact element mechanically linked to said actuation arm and said positions controlled by motion of said actuation arm, wherein said conductive contact element is electrically connected in series with said illumination source and said electrical power source when said conductive contact element is in said conducting position, and
a flexible seal connected to said actuation arm and extending to said body thereby preventing water from entering said body and holding said actuation arm so that said electrically conductive contact element is in said nonconductive position in the absence of movement of water past said external portion of said actuation arm.
2. The fishing lure of claim 1, wherein said illumination source is an incandescent bulb.
3. The fishing lure of claim 1, wherein said illumination source is a light emitting diode emitting at a primary spectral wavelength.
4. The fishing lure of claim 1, wherein said illumination source is a light emitting diode emitting over a contiguous range of spectral wavelengths.
5. The fishing lure of claim 1, wherein said illumination source comprises multiple light emitting diodes, each emitting at individual primary spectral wavelengths.
6. The fishing lure of claim 1, wherein said electrical power source is a battery.
7. The fishing lure of claim 1, wherein said electrically conducting contact element is placed in said conducting position by relative motion of water past said external portion of said actuation arm.
8. The fishing lure of claim 1, wherein said external portion of said actuation arm is shaped like a spoon.
9. The fishing lure of claim 1, wherein said external portion of said actuation arm is shaped like a fin.
10. The fishing lure of claim 1, wherein said external portion of said actuation arm is shaped like a paddle.
11. A fishing lure comprising:
a hollow body having an aperture therein;
an illumination source mounted within said body;
an electrical power source mounted within said body;
a pivotally mounted actuation arm penetrating said aperture in said body, said
actuation arm having a portion internal to said body and a portion external to said body;
an electrically conductive contact element mounted inside said body having a nonconductive position and a conductive position, said conductive contact element mounted on said actuation arm and said positions controlled by motion of said actuation arm, wherein said conductive contact element is electrically connected in series with said illumination source and said electrical power source when said conductive contact element is in said conducting position, and a flexible seal connected to said actuation arm and extending to said body so that said actuation arm is pivotably mounted on said flexible seal, thereby preventing water from entering said body and holding said actuation arm so that said electrically conductive contact element is in said nonconductive position in the absence of movement of water past said external portion of said actuation arm.

12. The fishing lure of claim 11, wherein said illumination source is an incandescent bulb.

13. The fishing lure of claim 11, wherein said illumination source is one or more light emitting diodes.

14. The fishing lure of claim 11, wherein said illumination source may be intermittent in nature.

15. The fishing lure of claim 11, wherein said electrically conducting contact element is normally in said nonconducting position, wherein said electrically conductive contact element is placed in said conducting position by relative motion of water past said external portion of said actuation arm.

16. A fishing lure comprising:

a hollow body having an aperture therein;

an illumination source mounted within said body;

a battery mounted within said body;

a pivotally mounted actuation arm penetrating said aperture in said body, said actuation arm having a portion internal to said body and a portion external to said body;

in electrically conductive contact element mounted inside said body having a nonconductive position and a conductive position, said conductive contact element mounted on said actuation arm and said positions controlled by motion of said actuation arm, wherein said conductive contact element is electrically connected in series with said illumination source and said battery when said conductive contact element is in said conducting position; and a flexible seal connected to said actuation arm and extending to said body thereby preventing water from entering said body and holding said actuation arm so that said electrically conductive contact element is in said nonconductive position in the absence of movement of water past said external portion of said actuation arm.

17. The fishing lure of claim 16, wherein said illumination source is an incandescent bulb.

18. The fishing lure of claim 16, wherein said illumination source is one or more light emitting diodes.

19. The fishing lure of claim 16, wherein said electrically conducting contact element is normally in said nonconducting position by said holding action of said actuation arm by said flexible seal, wherein said electrically conductive contact element is placed in said conducting position by pivoting action of said actuation arm about said flexible seal by relative motion of water past said external portion of said actuation arm.

* * * * *